United States Patent
Teboulle et al.

(10) Patent No.: US 12,452,221 B2
(45) Date of Patent: Oct. 21, 2025

(54) METHOD AND SYSTEM FOR COLLECTING CONSUMPTION DATA MEASURED BY SMART METERS

(71) Applicant: SAGEMCOM ENERGY & TELECOM SAS, Bois-Colombes (FR)

(72) Inventors: Henri Teboulle, Bois-Colombes (FR); Ziv Roter, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/806,184

(22) Filed: Aug. 15, 2024

(65) Prior Publication Data
US 2025/0063026 A1  Feb. 20, 2025

(30) Foreign Application Priority Data
Aug. 17, 2023 (FR) ........................ 2308748

(51) Int. Cl.
*H04L 9/40* (2022.01)

(52) U.S. Cl.
CPC ................. *H04L 63/0442* (2013.01)

(58) Field of Classification Search
CPC .................................. H04L 63/0442
See application file for complete search history.

(56) References Cited

U.S. PATENT DOCUMENTS

| | | | | |
|---|---|---|---|---|
| 2020/0028540 | A1* | 1/2020 | Teboulle | H04L 12/66 |
| 2022/0303647 | A1* | 9/2022 | Sabraoui | G06Q 10/00 |
| 2023/0216660 | A1* | 7/2023 | Teboulle | H04L 9/3066 |
| | | | | 380/28 |

FOREIGN PATENT DOCUMENTS

| | | |
|---|---|---|
| EP | 3122061 A1 | 1/2017 |
| EP | 3598801 A1 | 1/2020 |
| EP | 4064146 A1 | 9/2022 |
| EP | 4207675 A1 | 7/2023 |

OTHER PUBLICATIONS

Mar. 4, 2024 Search Report issued in French Patent Application No. 922337.

* cited by examiner

*Primary Examiner* — Henry Tsang
(74) *Attorney, Agent, or Firm* — Williams Mullen; R. Brian Drozd

(57) ABSTRACT

In an automated management system, an information system delegates a collection of consumption data to a data concentrator. Through a communication network, consumption data from primary smart meters are collected in the form of business data formatted in accordance with a communication protocol. To collect consumption data from secondary smart meters, at least one gateway is used, the consumption data then being collected in the form of business data formatted in accordance with a communication protocol. An asymmetric encryption is used end to end to ensure non-repudiation of the data collected from the secondary smart meters, and the business data formatted in accordance with a communication protocol are encapsulated in business data formatted in accordance with a communication protocol to enable them to be transported via the communication network.

8 Claims, 5 Drawing Sheets

METHOD AND SYSTEM FOR COLLECTING CONSUMPTION DATA MEASURED BY SMART METERS

TECHNICAL FIELD

At least one embodiment relates to a method and a system for collecting consumption data measured by a smart meter. The system in question is adapted to make a collection of such data coming from a plurality of smart meters, whether for measurements of consumption of fluid (such as gas, water, heat, petrol) or electrical-consumption measurements.

PRIOR ART

Smart meters are known, of the electricity meter type (electricity consumption meters) or fluid meters (fluid-consumption meters), which comprise communication interfaces enabling an automated management system to make a remote collection of consumption data. For example, smart electricity meters comprise a communication interface of the powerline communications (PLC) type. Consumption data can thus be transmitted, at regular intervals or not, to an information system IS processing them in a centralised manner.

The consumption data collected must be free from errors to avoid any disputes related to a contesting of their values. Errors may stem in particular from an alteration during transmission thereof. In the case of a dispute about consumption data between a customer and a service provider, one solution consists of the service provider sending to the customer an operator to make a direct reading of the consumption data on a display of the meter. Such a solution is not satisfactory since it requires firstly the meter being equipped with a display and secondly the operator travelling to the home of the customer, which is tedious and expensive.

It is then desirable to provide a solution that makes it possible to certify that the consumption data collected remotely from a smart meter by an information system do indeed come from said smart meter. It is in particular desirable to provide a solution that makes it possible to easily change an existing collection infrastructure (i.e. one already deployed in the field) while ensuring that the consumption data collected are not repudiated.

DISCLOSURE OF THE INVENTION

For this purpose, a method is proposed for collecting consumption data by an information system in an automated management system, the automated management system comprising a data concentrator to which the information system delegates the collection of data and a communication network via which the data concentrator connects consumption data formatted in accordance with a communication protocol P2 from smart meters of a first type, referred to as primary smart meters, the automated management system further comprising at least one gateway connected to the communication network, each gateway serving as a relay for collecting consumption data formatted in accordance with a communication protocol P1 from smart meters of a second type, referred to as secondary smart meters, the method being such that:
  each secondary smart meter transmits its consumption data accompanied by a hashcode derived from said consumption data, in business data formatted in accordance with the communication protocol P1 and signed using a private asymmetric encryption key;
  each gateway relays, to the data concentrator via the communication network, the data signed by a said secondary smart meter while encapsulating them in business data formatted in accordance with the communication protocol P2;
  the data concentrator relays to the information system the business data formatted in accordance with the communication protocol P2 that are received via the communication network;
  and, when the business data formatted in accordance with the communication protocol P2 include business data formatted in accordance with the communication protocol P1, the information system:
    decrypts the business data formatted in accordance with the communication protocol P1 using an asymmetric public encryption key corresponding to the secondary smart meter from which the consumption data are supposed to be collected,
    generates a reference hashcode from the consumption data received in the decrypted business data and from information known to the information system,
    compares the reference hashcode generated and the hashcode received in the decrypted business data, and validates the consumption data received in the decrypted business data when the reference hashcode generated and the hashcode received in the decrypted business data match.

Thus it is easy to change an existing collection infrastructure (i.e. one already deployed in the field) that is adapted to collecting consumption data from the primary smart meters, so as further to allow collecting the consumption data from the secondary smart meters, while ensuring non-repudiation of the consumption data collected from said secondary smart meters.

In a particular embodiment, the primary smart meters are smart electricity meters and the secondary smart meters are smart meters for the consumption of fluid (gas, water, petrol, etc).

In a particular embodiment, the communication protocol P1 is of the M-Bus or wM-Bus type.

In a particular embodiment, the communication protocol P2 is of the DLMS/COSEM type.

In a particular embodiment, the hashcode derived from said consumption data is calculated by applying a hash function to a quadruplet comprising a serial number of said meter, a cyclic redundancy code calculated using metrology software used for obtaining the consumption data, a certificate number certifying that said secondary smart meter is enabled to be used in the automated management system, and the consumption data themselves.

In a particular embodiment, the business data in accordance with the protocol P2 are transported via the communication network in encrypted form using a symmetric encryption key dedicated to the communications between the gateway concerned and the data concentrator.

In a particular embodiment, the business data in accordance with the protocol P1 are transported from the secondary smart meter concerned to the gateway concerned in encrypted form using a symmetric encryption key dedicated to the communications between said secondary smart meter and the gateway in question.

An automated management system is also proposed, configured to collect consumption data, the automated management system comprising an information system and a data concentrator, the information system being configured to delegate the collection of data to the data concentrator, the automated management system further comprising a communication network via which the data concentrator collects consumption data formatted in accordance with a communication protocol P2 from smart meters of a first type, referred to as primary smart meters, the automated management system further comprising at least one gateway connected to the communication network, each gateway serving as a relay for collecting consumption data formatted in accordance with a communication protocol P1 from smart meters of a second type, referred to as secondary smart meters, the automated management system comprising electronic circuitry configured so that:

each secondary smart meter transmits its consumption data accompanied by a hashcode derived from said consumption data, in business data formatted in accordance with the communication protocol P1 and signed using a private asymmetric encryption key;

each gateway relays, to the data concentrator via the communication network, the data signed by a said secondary smart meter while encapsulating them in business data formatted in accordance with the communication protocol P2;

the data concentrator relays to the information system the business data formatted in accordance with the communication protocol P2 that are received via the communication network;

and, when the business data formatted in accordance with the communication protocol P2 include business data formatted in accordance with the communication protocol P1, the information system:

decrypts the business data formatted in accordance with the communication protocol P1 using an asymmetric public encryption key corresponding to the secondary smart meter from which the consumption data are supposed to be collected, generates a reference hashcode from the consumption data received in the decrypted business data and from information known to the information system, compares the reference hashcode generated and the hashcode received in the decrypted business data, and validates the consumption data received in the decrypted business data when the reference hashcode generated and the hashcode received in the decrypted business data match.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1A:
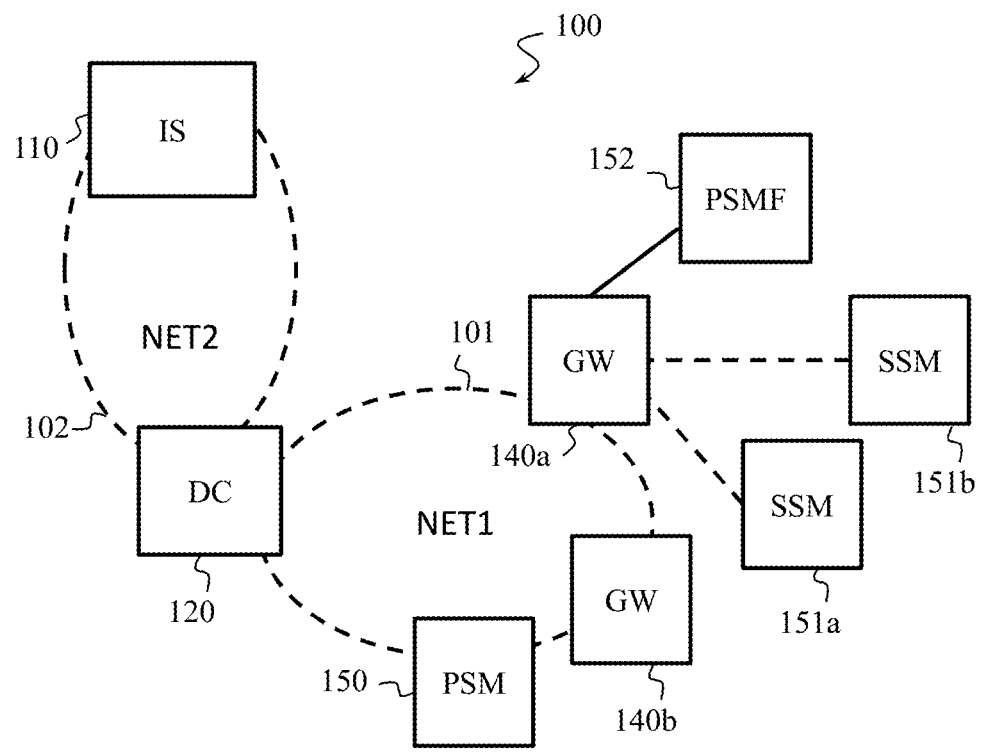
FIG. 1A illustrates schematically an automated management system for collecting consumption data.

FIG. 1A illustrates schematically an automated management system 100 in which the present invention can be implemented. The automated management system 100 is configured to make a collection of consumption data resulting from measurements made by smart meters 150, 151a, 151b, 152.

Two types of smart meter are illustrated schematically on FIG. 1A: so-called primary smart meters (PSM) 150 and so-called secondary smart meters (SSM) 151a, 151b. The secondary smart meters SSM 151a, 151b are configured to implement a communication protocol P1. The primary smart meters PSM 150 are configured to implement a communication protocol P2 distinct from the communication protocol P1. The secondary smart meters SSM 151a, 151b do not implement the communication protocol P2.

As detailed below, FIG. 1A also shows a particular functionality, namely a primary smart meter functionality PSMF 152 attached to a gateway GW 140a, 140b. The primary smart meter functionality PSMF 152 is configured to implement the communication protocol P2, like the primary smart meters PSM 150.

The consumption data coming from the smart meters are collected through a communication network NET1 101. The primary smart meters PSM 150 have a communication interface with the communication network NET1 101. The consumption data coming from the primary smart meters PSM 150 are thus collected directly from said primary smart meters PSM 150.

The consumption data coming from the secondary smart meters SSM 151a 151b are collected by means of gateways GW 140a, 140b. The gateways GW 140a, 140b serve as relays for the consumption data coming from the secondary smart meters SSM 151a, 151b, which do not have a communication interface adapted to the communication network NET1 101.

In one particular embodiment, as illustrated on FIG. 1A, at least one gateway GW 140a has a primary smart electricity meter functionality PSMF 152. The primary smart electricity meter functionality PSMF 152 is included in the gateway GW 140a or is implemented in a device connected to the gateway GW 140a by a simple electrical physical layer, for example a physical layer in accordance with the standard EIA-485 (often called RS-485) or in accordance with the standard RS-232. In other words, the gateway GW 140a interacts with the primary smart electricity meter functionality PSMF 152, in order in particular to obtain consumption data coming from the primary smart electricity meter functionality PSMF 152, which implements the communication protocol P2. The assembly formed by the gateway GW 140a and the primary smart electricity meter functionality PSMF 152 is thus equivalent to a primary smart meter PSM 150 (where the gateway GW 140a, 140b provides access to the communication network NET1 101), with furthermore a relay capability on behalf of secondary smart meters SSM 151a, 151b.

In a particular embodiment, the communication network NET1 101 is a PLC network, the primary smart meters PSM 150 are electricity meters and the secondary smart meters SSM 151a, 151b are meters for the consumption of fluid (gas, water or other). The secondary smart meters SSM 151a, 151b then typically function on a battery. For example, the communication network NET1 101 conforms to the G3-PLC or PRIME or G3-Hybrid or PRIME-Hybrid specifications.

The consumption data collected are processed by an information system IS 110. The information system IS 110 delegates the collection of the consumption data to data concentrators DC 120, so as to distribute the collection load. Each data concentrator DC 120 thus manages a collection network, such as the communication network NET1 101, and serves as relay between the smart meters and the information system IS 110. Thus at least one data concentrator DC 120 manages a collection network to which primary smart meters PSM 150 are connected, as well as secondary smart meters SSM 151a, 151b, and potentially primary smart meter functionalities PSMF 152, through gateways GW 140a, 140b.

As schematically illustrated on FIG. 1A, the data concentrator DC 120 is external to the information system IS 110 and communicates with the information system IS 110 by means of a communication network NET2 102. In a variant embodiment, the data concentrator DC 120 is virtualised in the information system IS 110. For example, the communication network NET2 102 is a wireless communication network of the 5G (5th Generation) type. According to other examples the communication network NET2 102 is a wireless communication network of the GPRS ("General Packet Radio Service"), UMTS ("Universal Mobile Telecommunications System"), LTE ("Long-Term Evolution"), NB-IoT ("Narrowband Internet of Things"), 2G or 3G type.

The primary smart meters PSM 150 and the primary smart meter functionality PSMF 152 format the consumption data using formatting in accordance with the communication protocol P2. The communication protocol P2 specifies business data formats (i.e. application data) as well as transport data and transport rules adapted to the transmission of these business data. Thus, to be able to interpret these business data, a device must be compatible with the communication protocol P2 (i.e. beyond the interpretation of transport data and knowledge of the transport rules). The data concentrator DC 120 is compatible with the communication protocol P2.

In a particular embodiment, the communication protocol P2 conforms to the DLMS/COSEM ("Device Language Message Specification/Companion Specification for Energy Metering") specifications, as described in the IEC 62056 series of standards.

The primary smart meters SSM 151a, 151b format their consumption data using formatting in accordance with the communication protocol P1. The communication protocol P1 specifies business data formats (i.e. application data) as well as transport data and transport rules adapted to the transmission of these business data. Thus, to be able to interpret these business data, a device must be compatible with the communication protocol P1 (i.e. beyond the interpretation of transport data and knowledge of the transport rules). The communication protocol P1 is different from the communication protocol P2. The data concentrator DC 120 is not compatible with the communication protocol P1.

In a particular embodiment, the communication protocol P1 conforms to the M-Bus ("Meter Bus") remote reading specifications as defined in EN 13757-2 or to the wM-Bus ("Wireless M-Bus") specifications as defined in EN 13757-4.

Figure 1B:
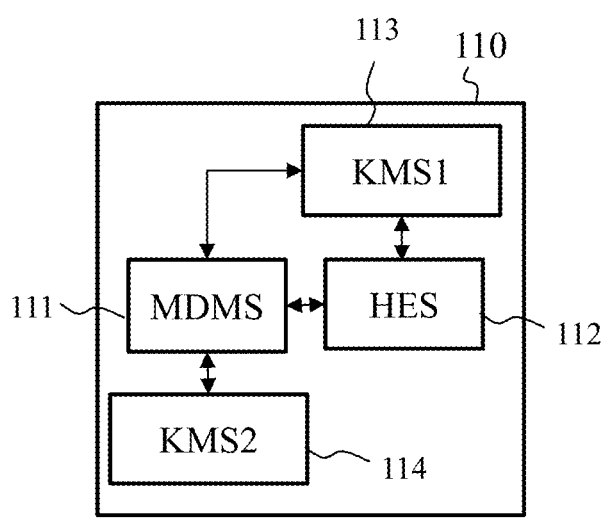
FIG. 1B illustrates schematically an arrangement of an information system of the automated management system, in a particular embodiment.

FIG. 1B illustrates schematically an arrangement of the information system IS 110 in a particular embodiment. Thus, the information system IS 110 comprises various components including a network head-end system (HES) 112, a Meter Data Management System (MDMS) 111, a first Key Management System (KMS) 113, labelled KMS1, and a second Key Management System 114, labelled KMS2.

The network head-end system HDS 112 is configured to manage transmissions in the context of collecting consumption data, and the meter data management system MDMS 111 is configured to process the consumption data collected. The first key management system KMS1 113 is configured to store symmetric encryption keys. There is a first symmetric encryption key SK1 for each secondary smart meter SSM 151a, 151b for communicating in a secure manner with the gateway GW 140a, 150b on which said secondary smart meter SSM 151a, 151b is dependent. There is a second symmetric encryption key SK2 for each primary smart meter PSM 150 for communicating in a secure manner with the data concentrator DC 120. There is also a second symmetric encryption key SK2 for each gateway GW 140a, 140b for communicating in a secure manner with the data concentrator DC 120. The first key management system KMS1 113 is configured to ensure that each device in the automated management system 100 has available each symmetric encryption key SK1, SK2 that is necessary to it.

The second key management system KMS2 114 is configured to store public asymmetric encryption keys. There is a public asymmetric encryption key AK1 for each secondary smart meter SSM 151a, 151b. A private asymmetric encryption key AK2, which is held in the automated management system 100 solely by the secondary smart meter SSM 151a, 151b in question, corresponds to each public asymmetric encryption key AK1. The private asymmetric encryption key AK2 is for example derived from a serial number of the corresponding secondary smart meter SSM 151a, 151b. The public asymmetric encryption key AK1 is used for decrypting encrypted data by means of the corresponding private asymmetric encryption key AK2. Each pair consisting of public asymmetric encryption key AK1 and private asymmetric encryption key AK2 makes it possible to ensure non-repudiation of the consumption data transmitted from the secondary smart meter SSM 151a, 151b in question to the information system IS 110.

Thus the encryption keys stored by the second key management system KMS2 114 are accessed by the meter data management system MDMS 111. And, in accordance with the infrastructures of the information system IS 110 and of the automated management system 100, the encryption keys stored by the first key management system KMS1 113 are accessed by means of the meter data management system MDMS 111 and/or by means of the network head-end system HES 112.

In a variant, the first key management system KMS1 113 and the second key management system KMS2 114 are merged in one and the same key management system KMS then storing the aforementioned symmetric encryption keys and the public asymmetric encryption keys.

The components of the information system IS 110 communicate for example using the internet, or more generally a network of the IP ("Internet Protocol") type, or potentially using a virtual private network VPN.

Figure 2:
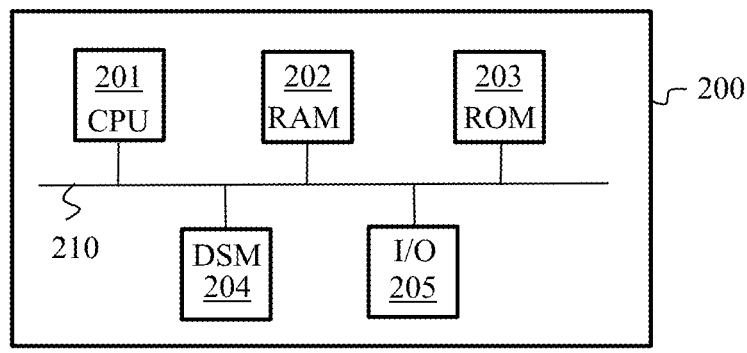
FIG. 2 illustrates schematically an example of hardware architecture that is adapted to implement a device of the automated management system.

FIG. 2 illustrates schematically an example of hardware architecture 200 that is adapted to implement any device controller of the automated management system 100. The example of hardware architecture is thus adapted to implement a controller of an information system IS 110, or of any component of the information system IS 110. The example of hardware architecture is also adapted to implement a controller of a data concentrator DC 120. The example of hardware architecture is also adapted to implement a controller of a primary smart meter PSM 150. The example of hardware architecture is also adapted to implement a controller of a secondary smart meter SSM 151a, 151b. The example of hardware architecture is also adapted to implement a controller of a gateway GW 140a, 140b. The example of hardware architecture is also adapted to implement a controller of a device implementing a primary smart electricity meter functionality PSMF 152.

The hardware architecture 200 then comprises, connected by a communication bus 210: a processor or CPU ("central processing unit") 201; a random access memory (RAM) 202; a read only memory (ROM) 203 or EEPROM ("electrically-erasable programmable read-only memory"), or a flash memory; a data storage medium (DSM), such as a hard disk drive HDD, or a storage medium reader, such as an SD (Secure Digital) card reader; and at least one communication interface COM 205. Depending on the device concerned, the hardware architecture 200 may further comprise inputs/outputs, for example to make consumption measurements.

The processor 201 is capable of executing instructions loaded in the RAM 202 from the ROM 203, from an external memory (not shown), from a storage medium (such as an SD card), or from a communication network. When the hardware architecture 200 is powered up, the processor 201 is capable of reading instructions from the RAM 202 and executing them. These instructions form a computer program causing the implementation, by the processor 201, of the steps and algorithms described here in relation to the device concerned.

All or some of the steps and algorithms described here can thus be implemented in software form by executing a set of instructions by a programmable machine, such as a DSP ("digital signal processor") or a microcontroller, or be implemented in hardware form by a machine or a component (chip) or a set of components (chipset), such as an FPGA (field-programmable gate array) or an ASIC (application-specific integrated circuit). In general terms, each device of the automated management system 100 comprises electronic circuitry arranged and configured to implement the steps and algorithms described here in relation to the device in question.

Figure 3A:
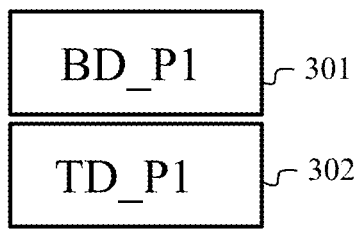
FIG. 3A illustrates schematically a first protocol stack adapted to make collections of consumption data in the automated management system with respect to secondary smart meters.
Figure 3B:
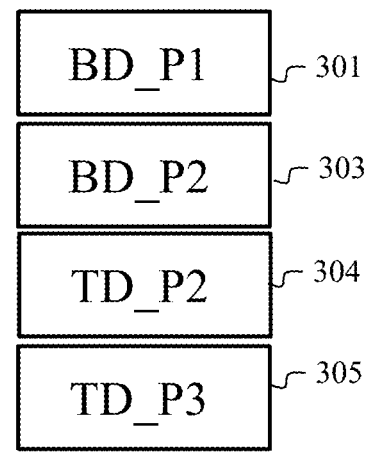
FIG. 3B illustrates schematically a second protocol stack adapted to make collections of consumption data in the automated management system with respect to secondary smart meters.
Figure 3C:
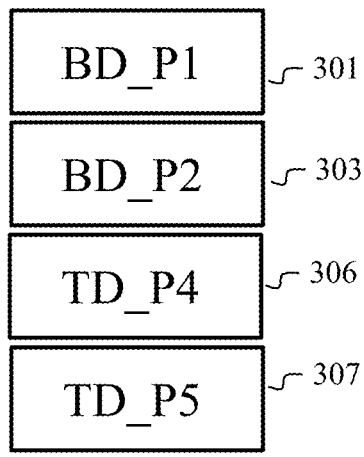
FIG. 3C illustrates schematically a third protocol stack adapted to make collections of consumption data in the automated management system with respect to secondary smart meters.

FIGS. 3A to 3C illustrate schematically protocol stacks adapted to make collections of consumption data in the automated management system 100 with respect to secondary smart meters SSM 151a, 151b.

FIG. 3A shows a first protocol stack that is adapted to transmit consumption data from a secondary smart meter SSM 151a, 151b to a gateway GW 140a, 140b on which said secondary smart meter SSM 151a, 151b is dependent. This first protocol stack comprises:
business data BD_P1 301;
transport data TD_P1 302.

The business data BD_P1 301 are formatted in accordance with the communication protocol P1. The business data BD_P1 301 include the consumption data, which must be transmitted to the information system IS 110. The business data BD_P1 301 are signed by means of the private asymmetric encryption key AK2 of the secondary smart meter SSM 151a, 151b from which said consumption data come.

For example, the business data BD_P1 301 are obtained by asymmetric encryption of a set of data including a hashcode denoted HASH from a quadruplet comprising:
a serial number of the secondary smart meter SSM 151a, 151b in question;
a cyclic redundancy code (CRC) calculated using metrology software used by the secondary smart meter SSM 151a, 151b in question;
an MID ("Measurement Instruments Directive") certificate number attributed to the secondary smart meter SSM 151a, 151b in question, said certificate certifying that the secondary smart meter SSM 151a, 151b in question has passed certification tests allowing it to be used in the automated management system 100 (in particular to take part in consumption invoicing operations);
the consumption data D.

In the context of legal metrology, the cyclic redundancy code CRC is calculated when the metrology software is generated. This cyclic redundancy code CRC is incorporated in the metrology software to which said cyclic redundancy code CRC corresponds. The metrology software is validated and next sent for certification to obtain certification. Once the certification is obtained, an MID certificate number is provided to the meter data management system MDMS 111, which then stores in memory, for each meter thus certified, the cyclic redundancy code CRC of the metrology software of said meter and the MID certificate number, in association with the serial number of the meter in question.

To obtain the hashcode, a hash function H(.) is used. The hash function H(.) is a particular function that, from data supplied as an input, calculates a numerical hashcode serving to quickly identify the initial data. In other words, a single hashcode that is the result of the hash function H(.) corresponds to a given quadruplet. Consequently, for two different quadruplets Q1 and Q2, the secondary smart meter SSM 151a, 151b generates two distinct hash codes S1=H(Q1) and S2=H(Q2).

In one embodiment, the function H(.) is an SHA-2 function (for example SHA-224, SHA-256, SHA-384 or SHA-512). In the case where the function H(.) is of the SHA-256 type, the hashcode HASH obtained comprises 256 bits. In the case where the function H is of the SHA-512 type, the hashcode HASH obtained comprises 512 bits. Other functions can be used as H(.) function, such as for example an SHA-3 function, an MD4 function, an MD5 function or an SHA-1 function, all well known in the cryptography field.

In a variant embodiment, the quadruplet is supplemented by stuffing bits in order to obtain an alignment on an integer number of bytes adapted to the hash function H(.) to be applied. A concatenation of the hashcode obtained with the consumption data is then included in the business data BD_P1 301 while respecting the formatting in accordance with the communication protocol P1.

The transport data TD_P1 302 are transport data in accordance with the communication protocol P1. The transport data TD_P1 302 and the business data BD_P1 301 are encrypted with the symmetrical encryption key SK1 known to the secondary smart meter SSM 151a, 151b in question and to the gateway GW 140a, 140b on which said secondary smart meter SSM 151a, 151b is dependent.

FIG. 3B shows a second protocol stack that is adapted to transmit consumption data coming from a secondary smart meter SSM 151a, 151b, from a gateway GW 140a, 140b (on which said secondary smart meter SSM 151a, 151b is dependent) to the data concentrator DC 120. This second protocol stack comprises:
 the business data BD_P1 301;
 business data BD_P2 303;
 transport data TD_P2 304;
 transport data TD_P3 305.

The business data BD_P1 301 are encapsulated in the business data BD_P2 303, for example in an object (for example a COSEM object) described among the business data of the communication protocol P2. To do this, the business data BD_P1 301 were previously decrypted with the symmetrical decryption key SK1 known to the secondary smart meter SSM 151a, 151b in question and to the gateway GW 140a, 140b. The business data BD_P1 301 do however remain signed (by means of the private asymmetric encryption key AK2).

The transport data TD_P2 304 are transport data in accordance with the communication protocol P2.

The transport data TD_P2 304 and the business data BD_P2 303 (including the encapsulated business data BD_P1 301) are encrypted with the symmetric encryption key SK2 known to the gateway GW 140a, 140b in question and to the data concentrator DC 120.

The transport data TD_P3 305 are transport data adapted to transporting frames in the communication network NET1 101. For example, the transport data TD_P3 305 are compliant with the transport specified in the G3-PLC specifications.

FIG. 3C shows a third protocol stack that is adapted to transmit consumption data coming from a secondary smart meter SSM 151a, 151b, from the data concentrator DC 120 to the information system IS 110. This third protocol stack comprises:
 the business data BD_P1 301;
 the business data BD_P2 303;
 transport data TD_P4 306;
 transport data TD_P5 307.

To do this, the business data BD_P2 303 (including the encapsulated business data BD_P1 301) were previously decrypted with the symmetric encryption key SK2 known to the gateway GW 140a, 140b in question and to the data concentrator DC 120. Here also, the business data BD_P1 301 remain signed (by means of the private asymmetric encryption key AK2). It is for the information system IS 110 to decrypt them, as detailed below.

The transport data TD_P4 306 are transport data of an intermediate layer (for example of the network layer in the OSI model) or of an application layer. For example, the transport data TD_P4 306 are compliant with the transport specified in the XML/HTTPS ("extensible Markup Language/Hypertext Transfer Protocol-Secure") standards. Several intermediate layers can thus be stacked in this third protocol stack.

The transport data TD_P5 307 are transport data adapted to transporting frames in the communication network NET2 102. For example, the transport data TD_P5 307 are compliant with the transport specified in the 5G specifications.

The third protocol stack can also be schematically used for transferring the consumption data in the information system IS 110, typically from the network head-end system HES 112 to the meter data management system MDMS 111, with other protocol layers involved. For example, the transport data TD_P4 306 are transport data of the type IPv6 or IPv4, and the transport data TD_P5 307 are transport data of the Ethernet type.

Figure 4A:
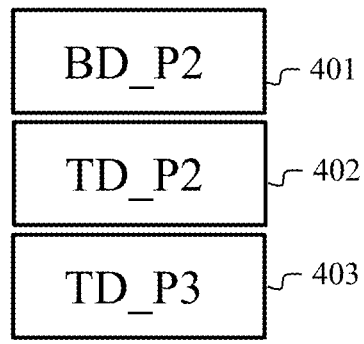
FIG. 4A illustrates schematically a first protocol stack adapted to make collections of consumption data in the automated management system with respect to primary smart meters.
Figure 4B:
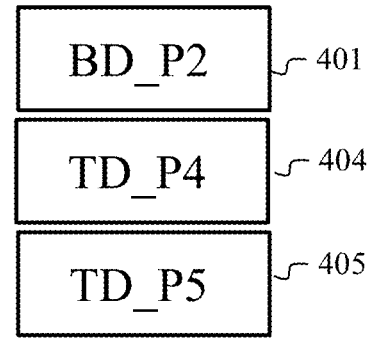
FIG. 4B illustrates schematically a second protocol stack adapted to make collections of consumption data in the automated management system with respect to primary smart meters.

FIGS. 4A and 4B illustrate schematically protocol stacks adapted to make collections of consumption data in the automated management system 100 with respect to primary smart meters PSM 150. In this case, the communication protocol P1 is not used. Thus, unlike FIGS. 3A to 3C, asymmetric encryption is not used here since the consumption data are directly formatted in accordance with the communication protocol P2. In a variant, it is also possible to do non-repudiation here, using asymmetric encryption of the same nature as for the secondary smart meters.

FIG. 4A shows a first protocol stack that is adapted to transmit consumption data from a primary smart meter PSM 150 to the data concentrator DC 120. This first protocol stack comprises:
 business data BD_P2 401;
 transport data TD_P2 402;
 transport data TD_P3 403.

The business data BD_P2 401 are formatted in accordance with the communication protocol P2. The business data BD_P2 401 include the consumption data, which must be transmitted to the information system IS 110.

For example, the business data BD_P2 401 are a set of data including a hashcode denoted HASH calculated from a quadruplet, as already described in relation to the business data BD_P1 301 (without asymmetric encryption, and also in a different format since the communication protocol P2 is directly used).

The transport data TD_P2 402 are transport data in accordance with the communication protocol P2. As in the case of the secondary smart meters SSM 151a, 151b, the transport data TD_P2 402 and the business data BD_P2 401 are encrypted with the symmetric encryption key SK2 known to the primary smart meter PSM 150 in question and to the data concentrator DC 120.

The transport data TD_P3 403 are transport data adapted to transporting frames in the communication network NET1 101 (like the transport data TD_P3 305).

FIG. 4B shows a second protocol stack that is adapted to transmit consumption data (coming from a primary smart meter PSM 150) from the data concentrator DC 120 to the information system IS 110. This second protocol stack comprises:
 business data BD_P2 401;
 transport data TD_P4 404;
 transport data TD_P5 405.

To do this, the business data BD_P2 401 were previously decrypted with the symmetric encryption key SK2 known to the gateway GW 140a, 140b in question and to the data concentrator DC 120.

The transport data TD_P4 404 (like the transport data TD_P4 306) are transport data of an intermediate layer (for example of the network layer in the OSI model) or of an application layer. Several intermediate layers can thus be stacked in this second protocol stacking.

The transport data TD_P5 405 (like the transport data TD_P5 307) are transport data adapted to transporting frames in the communication network NET2 102.

It should be noted that additional symmetric encryptions, in addition to those described here in relation to FIGS. 3A to 3C, 4A and 4B, can be applied by intermediate protocol layers.

Figure 5:
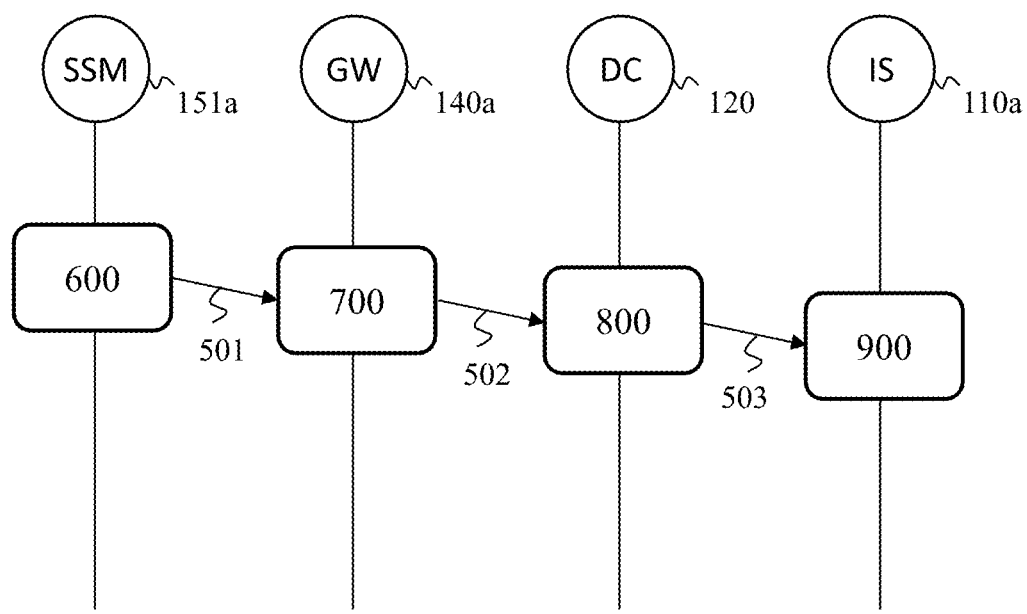
FIG. 5 illustrates schematically a succession of transmissions and of processing operations in the context of a collection of consumption data coming from a secondary smart meter.

FIG. 5 illustrates schematically a succession of transmissions and of processing operations in the context of a collection of consumption data coming from a secondary smart meter SSM, for example the secondary smart meter SSM 151*a* via the gateway GW 140*a*.

The secondary smart meter SSM 151*a* implements a processing 600 (as described below in relation to FIG. 6) to transmit, to the gateway GW 140*a*, a frame 501 in accordance with the protocol stack of FIG. 3A.

The gateway GW 140*a* then implements a processing 700 (as described below in relation to FIG. 7) to transmit, to the data concentrator DC 120, a frame 502 in accordance with the protocol stack of FIG. 3B.

The data concentrator DC 120 then implements a processing 800 (as described below in relation to FIG. 8) to transmit, to the information system IS 110, a frame 503 in accordance with the protocol stack of FIG. 3C.

The information system IS 110 then implements a processing 900 (as described below in relation to FIG. 9) to process the consumption data received.

Figure 6:
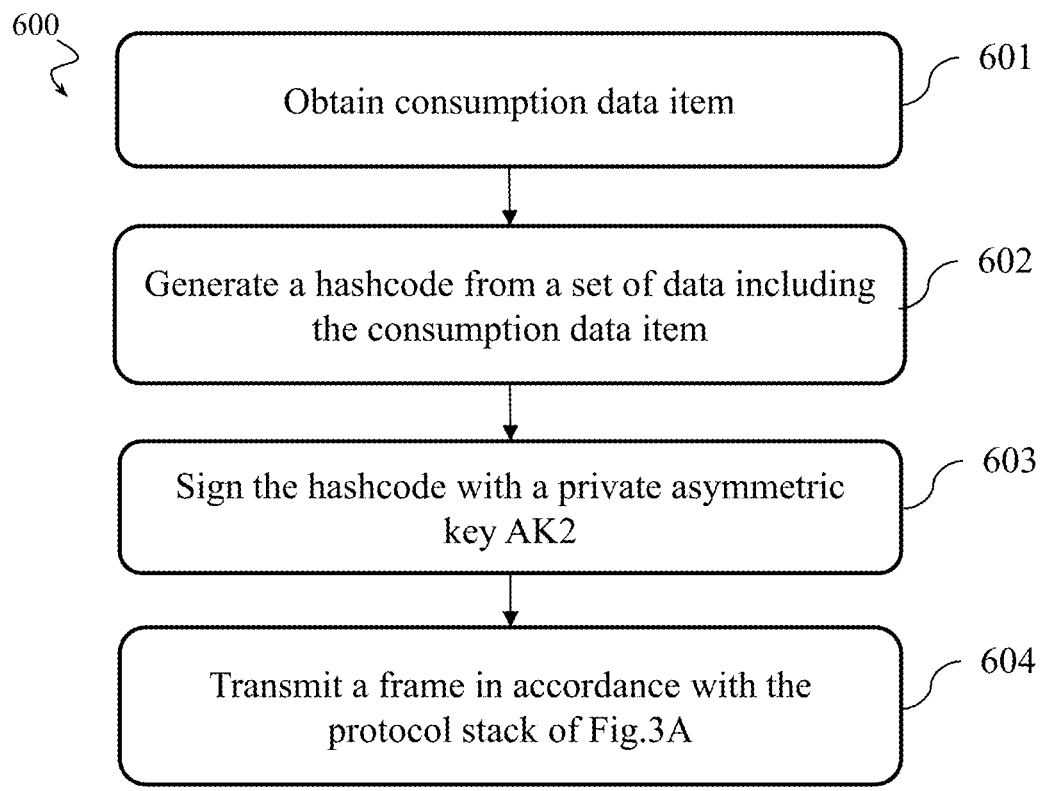
FIG. 6 illustrates schematically an algorithm implemented by a secondary smart meter for transmitting a frame to a gateway.

FIG. 6 illustrates schematically an algorithm implemented by a secondary smart meter SSM 151*a*, 151*b* for transmitting consumption data to the information system IS 110 by means of a gateway GW 140*a*, 140*b*.

In a step 601, the secondary smart meter SSM 151*a*, 151*b* obtains, by means of its metrology software, consumption data D to be transmitted to the information system IS 110.

In a step 602, the secondary smart meter SSM 151*a*, 151*b* preferentially generates a hashcode HASH from a set of data including the consumption data D. The hashcode is, in a particular embodiment, generated as previously described in relation to FIG. 3A.

In a step 603, the secondary smart meter SSM 151*a*, 151*b* signs the hashcode (or failing that the consumption data D) by means of its private asymmetric encryption key AK2 and thus obtains a signed hashcode HASH'.

In a step 604, the secondary smart meter SSM 151*a*, 151*b* transmits a frame in accordance with the protocol stack of FIG. 3A. The business data formatted in accordance with the communication protocol P1 therefore include the encrypted hashcode HASH' (encrypted with the private asymmetric encryption key AK2). The business and transport data in accordance with the communication protocol P1 are moreover encrypted with the symmetric encryption key SK1 held by the secondary smart meter SSM 151*a*, 151*b* in question.

Figure 7:
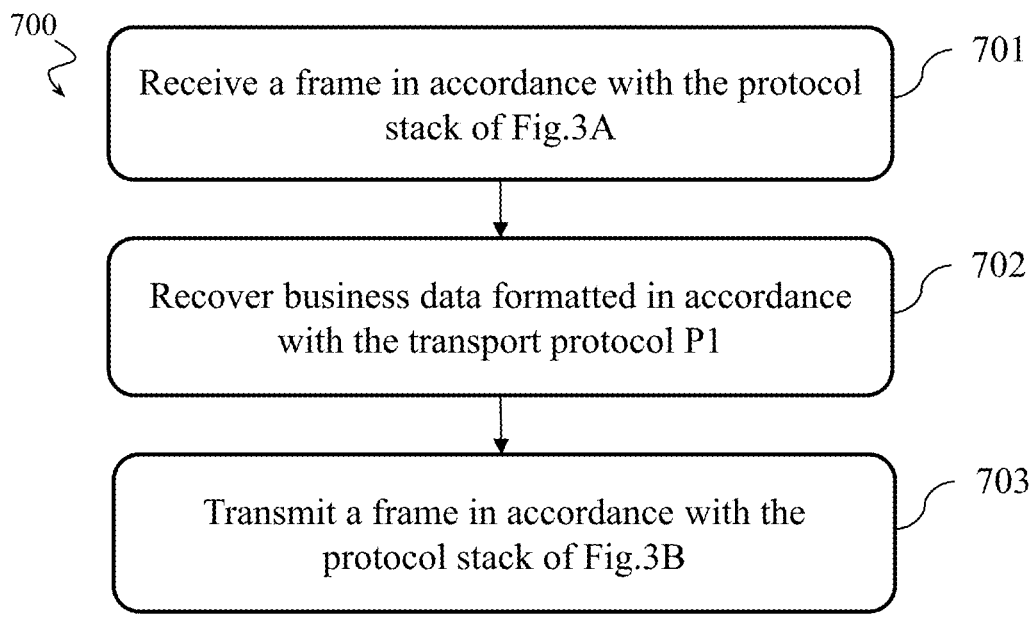
FIG. 7 illustrates schematically an algorithm implemented by a gateway for transmitting a frame to a data concentrator.

FIG. 7 illustrates schematically an algorithm implemented by a gateway GW 140*a*, 140*b* for relaying consumption data, coming from a secondary smart meter SSM 151*a*, 151*b*, to the information system IS 110 by means of the data concentrator DC 120. If In a step 701, the gateway GW SSM 140*a*, 140*b* receives a frame in accordance with the protocol stack of FIG. 3A.

In a step 702, the gateway GW 140*a*, 140*b* recovers, in the frame received, the business data formatted in accordance with the communication protocol P1 (which therefore include the encrypted hashcode HASH'). The business and transport data in accordance with the communication protocol P1 are therefore encrypted with the symmetric encryption key SK1 corresponding to the secondary smart meter SSM 151*a*, 151*b* in question.

In a step 703, the secondary smart meter SSM 151*a*, 151*b* transmits a frame in accordance with the protocol stack of FIG. 3B. The business data formatted in accordance with the communication protocol P2 then include the hashcode HASH'. The business and transport data in accordance with the communication protocol P2 are moreover encrypted with the symmetric encryption key SK2 held by the gateway GW 140*a*, 140*b* in question.

Figure 8:
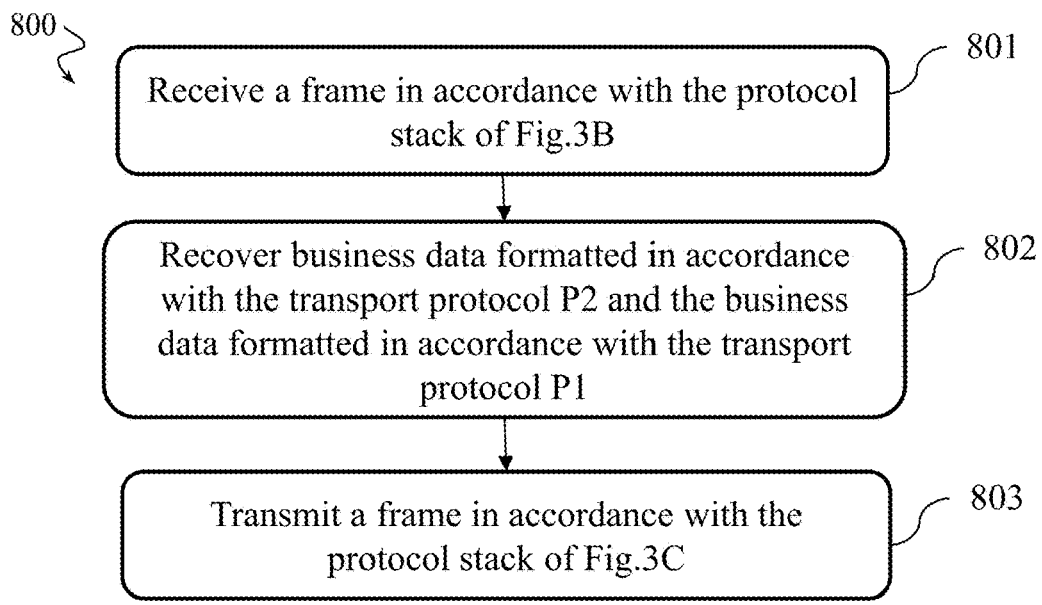
FIG. 8 illustrates schematically an algorithm implemented by the data concentrator for transmitting a frame to the information system.

FIG. 8 illustrates schematically an algorithm implemented by the data concentrator DC 120 for relaying consumption data, coming from a secondary smart meter SSM 151*a*, 151*b* and received by means of a gateway GW 140*a*, 140*b*, to the information system IS 110.

In a step 801, the data concentrator DC 120 receives a frame in accordance with the protocol stack of FIG. 3B.

In a step 802, the data concentrator DC 120 recovers, in the frame received, the business data formatted in accordance with the communication protocol P2, which therefore include the hashcode HASH' (without the data concentrator DC 120 having to know this). The business and transport data in accordance with the communication protocol P2 are moreover encrypted with the symmetric encryption key SK2 corresponding to the gateway GW 140*a*, 140*b* in question.

In a step 803, the data concentrator DC 120 transmits a frame in accordance with the protocol stack of FIG. 3C. The frame includes the business data formatted in accordance with the communication protocol P2, which therefore include the hashcode HASH' in a format in accordance with the communication protocol P1.

Figure 9:
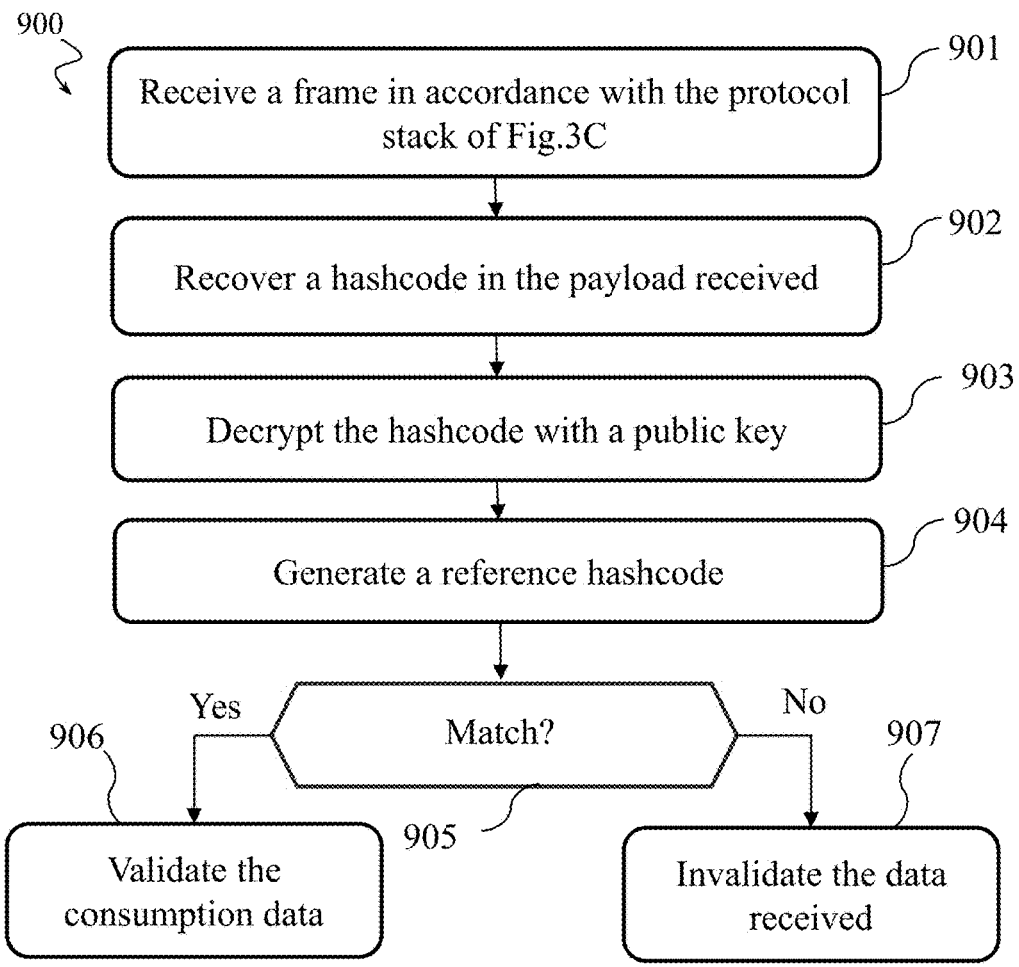
FIG. 9 illustrates schematically an algorithm implemented by the information system for processing a frame received from the data concentrator.

FIG. 9 illustrates schematically an algorithm implemented by the information system IS 110 for processing a frame received from the data concentrator DC 120 in the context of collecting consumption data coming from a secondary smart meter SSM 151*a*, 151*b*.

In a step 901, the information system IS 110 receives a frame in accordance with the protocol stack of FIG. 3C.

In a step 902, the information system IS 110 (more particularly the meter data management system MDMS 111) interprets the business data formatted in accordance with the communication protocol P2 and then recovers the business data formatted in accordance with the communication protocol P1 that are encapsulated therein. By interpreting the business data formatted in accordance with the communication protocol P1, the information system IS 110 then recovers the signed hashcode HASH'.

The information system IS 110 (more particularly the meter data management system MDMS 111) is capable of determining whether the business data formatted in accordance with the communication protocol P2 relate, firstly, to a primary smart meter PSM 150 or a primary smart meter functionality PSMF 152, or secondly a secondary smart meter SSM 151*a*, 151*b*. According to one possibility, the business data formatted in accordance with the communication protocol P2 include an object (for example a COSEM object) specific to the inclusion of business data formatted in accordance with the communication protocol P1. According to another possibility, the business data formatted in accordance with the communication protocol P2 include information identifying the smart meter, such as a serial number, the information system IS 110 knowing, for each smart meter in the automated management system 100, whether it is primary or secondary.

In a step 903, the information system IS 110 (more particularly the meter data management system MDMS 111) decrypts the signed hashcode HASH' using the public asymmetric encryption key AK2 that is associated with the secondary smart meter that generated the signed hashcode HASH'. The business data formatted in accordance with the communication protocol P2 include information identifying the secondary smart meter concerned, such as a serial number, and the information system IS 110 holds the public asymmetric encryption key AK2 corresponding to this information identifying said secondary smart meter SSM 151*a*, 151*b*.

In a step 904, the information system IS 110 (more particularly the meter data management system MDMS 111) generates a reference hashcode with the information that it holds concerning the secondary smart meter SSM 151*a*, 151*b* in question. The reference hashcode is generated in the same way as the hashcode HASH generated by said secondary smart meter SSM 151*a*, 151*b*.

In a step 905, the information system IS 110 (more particularly the meter data management system MDMS 111) compares the hashcode decrypted at the step 903 and the reference hashcode obtained at the step 904. If there is a match between the two hashcodes, a step 906 is performed; otherwise a step 907 is performed.

In the step 906, the information system IS 110 (more particularly the meter data management system MDMS 111) validates the consumption data received. These effectively come from said secondary smart meter SSM 151*a*, 151*b* and have not been altered.

In the step 907, the information system IS 110 (more particularly the meter data management system MDMS 111) invalidates the consumption data received. These cannot be attributed to said secondary smart meter SSM 151*a*, 151*b*. The information system IS 110 then generates an alarm.

Thus, by virtue of the above teachings, it is easy to upgrade the capabilities of an automated management system adapted to collect consumption data from a first type of smart meter that uses a communication protocol (here the communication protocol P2, such as DLMS/COSEM), so that this automated management system is also adapted to collect consumption data from a second type of smart meter that uses another communication protocol (here the communication protocol P1, such as M-Bus or wM-Bus). The information system IS (and particularly the meter data management system MDMS) must then be made compatible with this other communication protocol (P1), and using asymmetric encryption and gateways GW makes it possible to ensure non-repudiation of the consumption data transmitted by the smart meters of the second type. The upgrade for supporting the second type of smart meter is transparent for the connection network (here the communication network NET1 101), as well as for the data concentrator DC, which may already be deployed in the field.

The invention claimed is:

1. A method for collecting consumption data by an information system in an automated management system, the automated management system comprising a data concentrator to which the information system delegates the collection of data and a communication network via which the data concentrator collects consumption data formatted in accordance with a first communication protocol from smart meters of a first type, referred to as primary smart meters, the automated management system further comprising at least one gateway connected to the communication network, each gateway serving as a relay for collecting consumption data formatted in accordance with a second communication protocol from smart meters of a second type, referred to as secondary smart meters, wherein the method includes:

each secondary smart meter transmits its consumption data accompanied by a hashcode derived from said consumption data, in business data formatted in accordance with the second communication protocol and signed using a private asymmetric encryption key;

each gateway relays, to the data concentrator via the communication network, the data signed by a said secondary smart meter while encapsulating them in business data formatted in accordance with the first communication protocol;

the data concentrator relays to the information system the business data formatted in accordance with the first communication protocol that are received via the communication network;

and, when the business data formatted in accordance with the first communication protocol include business data formatted in accordance with the second communication protocol, the information system:

retrieves the signed hashcode from the business data formatted in accordance with the second communication protocol and decrypts the retrieved signed hashcode using an asymmetric public encryption key corresponding to the secondary smart meter from which the consumption data are supposed to be collected, generates a reference hashcode from the consumption data received in the business data formatted in accordance with the second communication protocol and from information known to the information system, compares the reference hashcode generated and the hashcode received in the business data formatted in accordance with the second communication protocol, and validates the consumption data received in the business data formatted in accordance with the second communication protocol when the reference hashcode generated and the decrypted signed hashcode match.

2. The method according to claim 1, wherein the primary smart meters are smart electricity meters and the secondary smart meters are smart meters for the consumption of fluid.

3. The method according to claim 2, wherein, the second communication protocol is of the M-Bus or wM-Bus type.

4. The method according to claim 2, wherein the first communication protocol is of the DLMS/COSEM type.

5. The method according to claim 1, wherein the hashcode derived from said consumption data is calculated by applying a hash function to a quadruplet comprising a serial number of said meter, a cyclic redundancy code calculated from metrology software used for obtaining the consumption data, a certificate number certifying that said secondary smart meter is enabled to be used in the automated management system, and the consumption data themselves.

6. The method according to claim 1, wherein the business data in accordance with the first communication protocol are transported via the communication network in encrypted form using a symmetric encryption key dedicated to the communications between the gateway concerned and the data concentrator.

7. The method according to claim 1, wherein the business data in accordance with the second communication protocol are transported from the secondary smart meter concerned to the gateway concerned in encrypted form using a symmetric encryption key dedicated to the communications between said secondary smart meter and the gateway in question.

8. An automated management system configured to collect consumption data, the automated management system comprising an information system and a data concentrator, the information system being configured to delegate the collection of data to the data concentrator, the automated management system further comprising a communication network via which the data concentrator collects consumption data formatted in accordance with a first communication protocol from smart meters of a first type, referred to as primary smart meters, the automated management system further comprising at least one gateway connected to the communication network, each gateway serving as a relay for collecting consumption data formatted in accordance with a second communication protocol from smart meters of a second type, referred to as secondary smart meters, the automated management system comprising electronic circuitry configured so that:

each secondary smart meter transmits its consumption data accompanied by a hashcode derived from said consumption data, in business data formatted in accordance with the second communication protocol and signed using a private asymmetric encryption key;

each gateway relays, to the data concentrator via the communication network, the data signed by a said secondary smart meter while encapsulating them in business data formatted in accordance with the first communication protocol;

the data concentrator relays to the information system the business data formatted in accordance with the first communication protocol that are received via the communication network;

and, when the business data formatted in accordance with the first communication protocol include business data formatted in accordance with the second communication protocol, the information system:

retrieves the signed hashcode from the business data formatted in accordance with the second communication protocol and decrypts the retrieved signed hashcode using an asymmetric public encryption key corresponding to the secondary smart meter from which the consumption data are supposed to be collected, generates a reference hashcode from the consumption data received in the business data formatted in accordance with the second communication protocol and from information known to the information system, compares the reference hashcode generated and the hashcode received in the business data formatted in accordance with the second communication protocol, and validates the consumption data received in the business data formatted in accordance with the second communication protocol when the reference hashcode generated and the decrypted signed hashcode match.

\* \* \* \* \*